(12) United States Patent
Ge et al.

(10) Patent No.: US 8,355,249 B2
(45) Date of Patent: Jan. 15, 2013

(54) PROTECTIVE COVER MECHANISM

(75) Inventors: Peng-Jin Ge, Shenzhen (CN); Yu-Fei Chen, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 271 days.

(21) Appl. No.: 12/824,313

(22) Filed: Jun. 28, 2010

(65) Prior Publication Data

US 2011/0240496 A1 Oct. 6, 2011

(30) Foreign Application Priority Data

Mar. 31, 2010 (CN) ...................... 2010 2 0146541 U

(51) Int. Cl.
*G06F 1/16* (2006.01)
*H05K 5/00* (2006.01)
*H05K 7/00* (2006.01)

(52) U.S. Cl. ................. 361/679.56; 220/345.1; 220/351; 220/345.4

(58) Field of Classification Search ................. 206/320, 206/528–540, 267, 249–255, 315.1; 220/820, 220/254.4, 345.1, 351, 354.4, 528; 455/575.1–575.6; 361/679.26, 361.58, 679.56; 379/433.12, 433.11; 221/306, 296; 222/546, 222/548, 561, 559, 560

See application file for complete search history.

(56) References Cited

U.S. PATENT DOCUMENTS

| | | | | |
|---|---|---|---|---|
| 2,532,690 | A | * | 12/1950 | Zimmerman .................... 222/92 |
| 2,722,309 | A | * | 11/1955 | Waterman .................. 206/534.2 |
| 3,788,517 | A | * | 1/1974 | Eannarino et al. ............. 221/154 |
| 3,792,803 | A | * | 2/1974 | Kessler .......................... 222/511 |
| D341,778 | S | * | 11/1993 | D'Amico et al. .............. D9/417 |
| 5,931,302 | A | * | 8/1999 | Isaacs et al. ................... 206/538 |
| 7,559,436 | B2 | * | 7/2009 | Bieger .......................... 221/256 |

* cited by examiner

*Primary Examiner* — Mickey Yu
*Assistant Examiner* — Chun Cheung
(74) *Attorney, Agent, or Firm* — Altis Law Group, Inc.

(57) ABSTRACT

A protective cover mechanism includes a housing, a protective cover and a latching pole. The housing includes an opening defined therethrough. The protective cover is configured for covering the opening of the housing and includes a latching slot defined therethrough. The latching slot includes a first latching end and an opposite second latching end. The latching pole is integrally formed on the housing adjacent to the opening and is penetrated through the latching slot of the protective cover for slidably or rotatably assembling the protective cover to the housing. The latching pole is latchable to the first latching end or the second latching end of the latching slot to expose or cover the opening of the housing.

7 Claims, 5 Drawing Sheets

PROTECTIVE COVER MECHANISM

TECHNICAL FIELD

This exemplary disclosure generally relates to protective cover mechanisms used in electronic devices (e.g. mobile phones).

DESCRIPTION OF RELATED ART

Portable electronic devices such as mobile phones and personal digital assistants (PDAs) are now widely used. Most of these portable electronic devices include a touch screen and a touch stylus. The portable electronic device usually defines an accommodating hole to receive the stylus.

However, when the stylus is taken out for use, the accommodating hole is exposed to the outside, allowing contaminants such as dust and moisture to enter. The contaminants could negatively affect the performance of the portable electronic device.

Therefore, there is room for improvement within the art

BRIEF DESCRIPTION OF THE DRAWINGS

Many aspects of the exemplary protective cover mechanism can be better understood with reference to the following drawings. The components in the various drawings are not necessarily drawn to scale, the emphasis instead being placed upon clearly illustrating the principles of the exemplary protective cover mechanism. Moreover, in the drawings, like reference numerals designate corresponding parts throughout the diagrams.

DETAILED DESCRIPTION

In this exemplary embodiment, the protective cover mechanism is applied to a portable electronic device such as a mobile telephone. The mobile telephone described herein is a representation of the type of portable electronic device that may benefit from the exemplary embodiment. However, it is to be understood that the exemplary embodiment may be applied to any type of hand-held or portable device including, but not limited to, the following devices: radiotelephones, cordless phones, personal digital assistants, and the like. Accordingly, any reference herein to the mobile telephone should also be considered to apply equally to other portable electronic devices.

Figure 1:
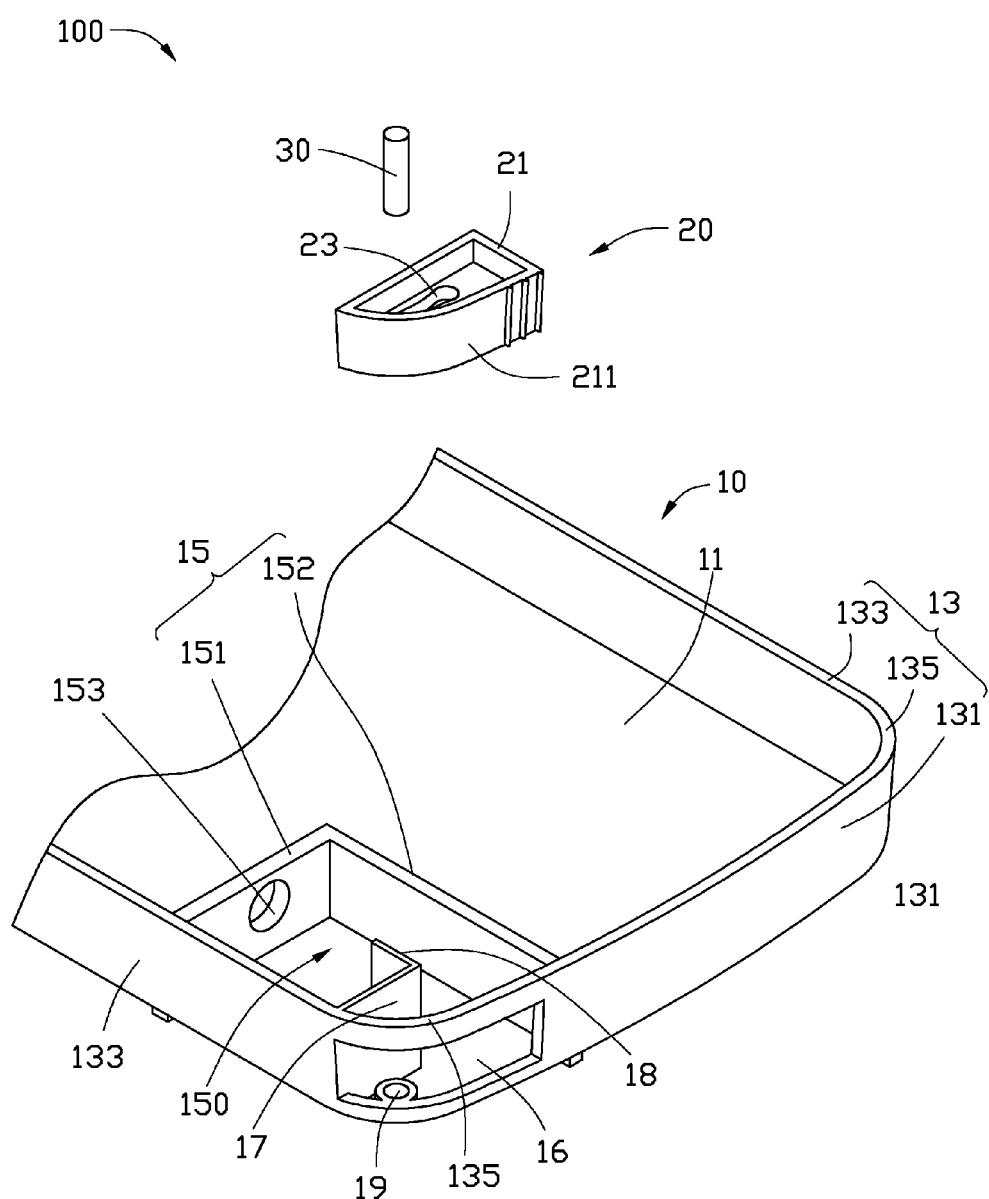
FIG. 1 shows an exploded perspective view of the protective cover mechanism, in accordance with an exemplary embodiment.

FIG. 1 shows an exploded perspective view of a protective cover mechanism 100 including a housing 10, a protective cover 20 and a latching pole 30. The housing 10 can be a back housing or a main body of a portable electronic device. The housing 10 includes a base wall 11, a peripheral wall 13 and a holding portion 15. The base wall 11 can be substantially rectangular. The peripheral wall 13 extends substantially perpendicularly from the peripheral edge of the base wall 11. The peripheral wall 13 includes an end wall 131 extending perpendicularly from an end portion of the base wall 11 and two side walls 133 extending perpendicularly from two sides of the base wall 11 and connecting the two ends of the end wall 131. Accordingly, the peripheral wall 13 forms two corner portions 135 adjacent to the two ends of the end wall 131.

The holding portion 15 is adjacent to one corner portion 135 of the housing 10, thereby forming a receiving space 150 cooperating with the base wall 11 and the corner portion 135. The holding portion 15 can be a substantially L-shaped board extending substantially perpendicularly from the base wall 11. The two ends of the holding portion 15 connect with the end wall 131 and one adjacent side wall 133. The holding portion 15 includes a first holding board 151 parallel to the end wall 131 and a second holding board 152 connects substantially perpendicularly with the first holding board 151 and substantially parallel to the side wall 133. The distal end of the first holding board 151 connects substantially perpendicularly with the adjacent side wall 133. The distal end of the second holding board 152 connects substantially perpendicularly with the end wall 131. Accordingly, the first holding board 151, the second holding board 152, the base wall 11, the end wall 131 and the adjacent one side wall 133 together form the receiving space 150. The first holding board 151 defines a through hole 153 axially perpendicular to the surface of the end wall 131.

An opening 16 is defined through one corner portion 135 of the peripheral wall 13 and communicates with the receiving space 150 for inserting an accessory of the portable electronic device such as a stylus (not shown). It is noteworthy that the opening 16 can also be for an external interface (e.g., universal serial bus (USB) or a port for electrically connecting with external devices (e.g., printers), accessories (e.g., USB flash drives) or other electronic devices.

A supporting board 17 extends perpendicularly from the sidewall 133 adjacent to the opening 16 and located within the receiving space 150. The supporting board 17 is for supporting and guiding the protective cover 20. The distal end of the supporting board 17 is bent toward the first holding board 151 side to form a clapboard 18 for facilitating the stylus being inserted into the receiving space 150 and passing through the corresponding through hole 153 of the first holding board 151. A fixing hole 19 is defined in the base wall 11 adjacent to the opening 16 of the corner portion 135 for fixing the latching pole 30. The latching pole 30 is a substantially cylindrical post and integrally fixed to the fixing hole 19 of the housing 10 for slidably assembling the protective cover 20 to the housing 10 to cover the opening 16 of the housing.

Figure 2:
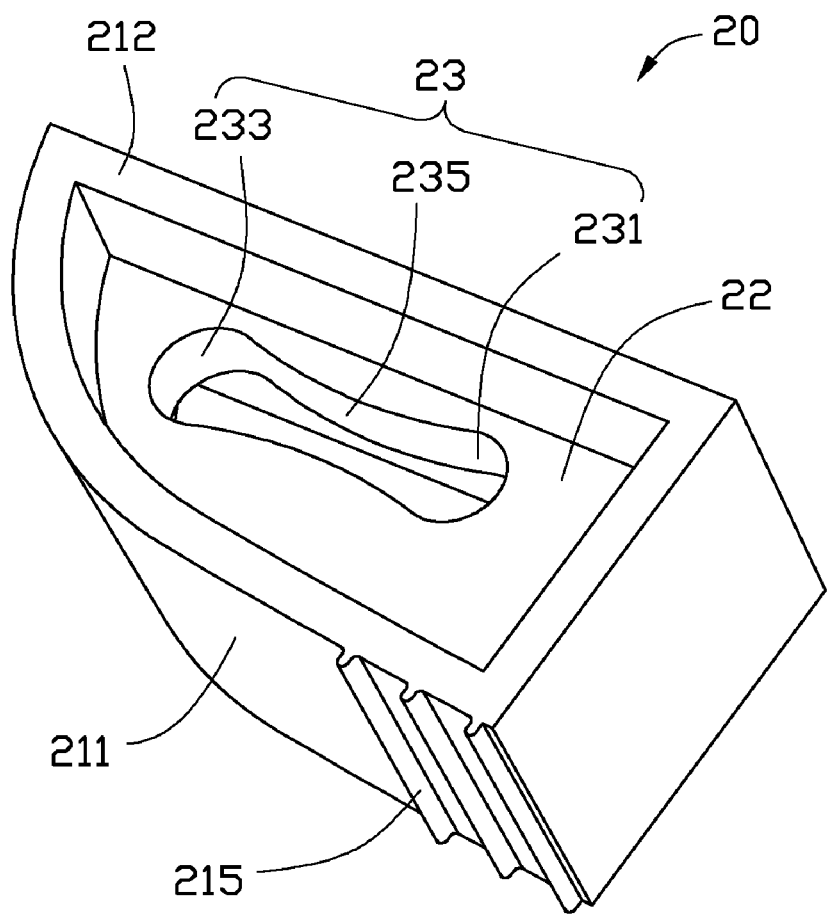
FIG. 2 shows a perspective view of the protective cover shown in FIG. 1, in accordance with an exemplary embodiment.

Referring also to FIG. 2, the protective cover 20 is slidably assembled to the latching pole 30 and the housing 10, and is received within the receiving space 150 to cover the opening 16 of the housing 10. The protective cover 20 can be made of elastic material such as rubber and includes a substantially triangular frame 21 and a substantially triangular base board 22. The frame 21 includes a substantially arc-shaped covering wall 211 and a substantially L-shaped enclosing wall 212 connecting with the two ends of the covering wall 211. The covering wall 211 has substantially the same shaped as the opening 16 of the housing 10 such that a protective cover 20 is assembled to the housing 10, the protective cover 20 is substantially hermetically received within the opening 16 of the housing 10. A plurality of ridges 215 protrude from an outer surface of the covering wall 211 adjacent one end thereof for facilitating the user's moving of the protective cover 20. The base board 22 includes a latching slot 23 defined therethrough corresponding to the latching pole 30.

The latching slot 23 includes a first latching end 231, a middle guiding slot 235, and an opposite second latching end 233. Both the first latching end 231 and the second latching end 232 are substantially a curved hole shaped so that it can communicate with the middle guiding slot 235. The diameters of the first latching end 231 and the second latching end 232 are substantially the same as the diameter of the latching pole 30 but slightly larger than that of the middle guiding slot 235.

Figure 3:
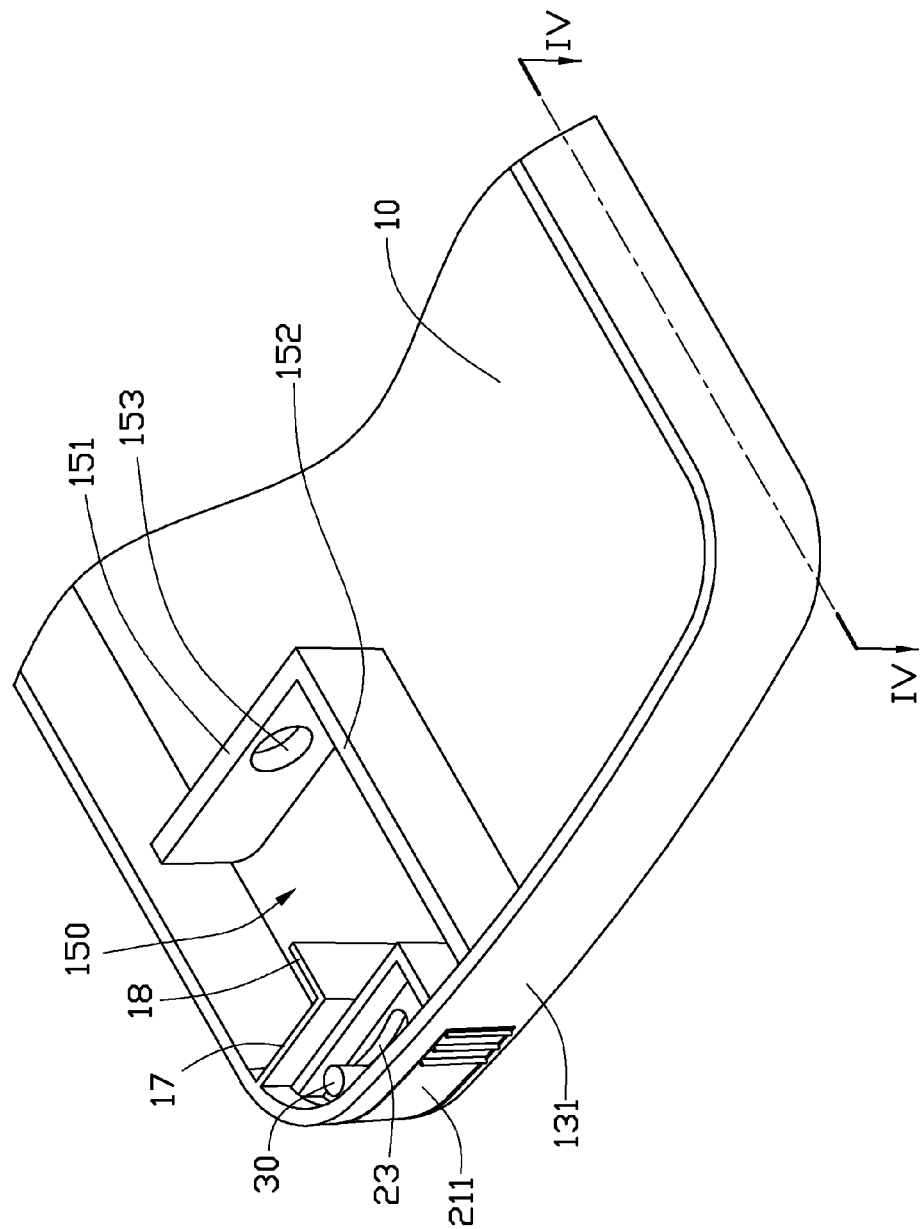
FIG. 3 shows an assembled perspective view of the protective cover mechanism, in accordance with an exemplary embodiment.
Figure 4:
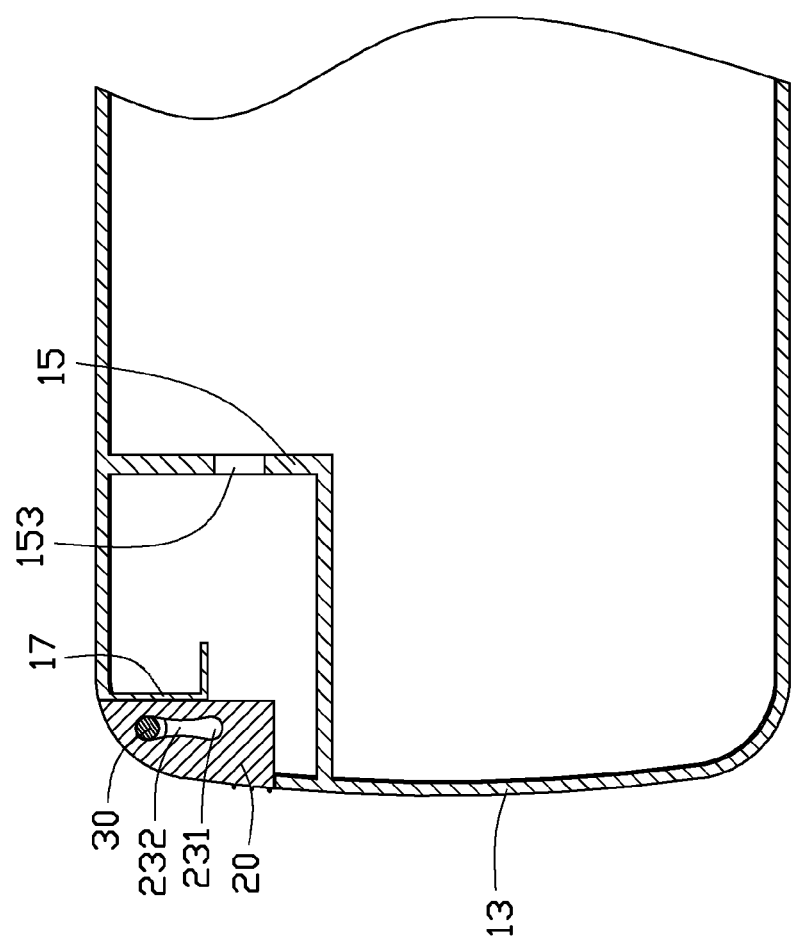
FIG. 4 shows a cross-sectional view of the protective cover mechanism, wherein, the cover is in a closed state.

Referring to FIGS. 3 and 4, to assemble the protective cover mechanism 100, the protective cover 20 is assembled to the housing 10 and inserted into the opening 16 of the peripheral wall 13 with the enclosing wall 212 abutting the supporting board 17. The latching pole 30 passes through the latching slot 23 of the protective cover 20 and is fixed to fixing hole 19 of the housing 10. With an external force, push the protective cover 20 toward the receiving space 150 until the protective cover 20 is totally accommodated within the receiving space 150, and the latching pole 30 slides along the latching slot 23 and latches into the second latching end 233. Then, the protective cover 20 is assembled to the housing 10 to cover the opening 16 and is accommodated within receiving space 150.

Figure 5:
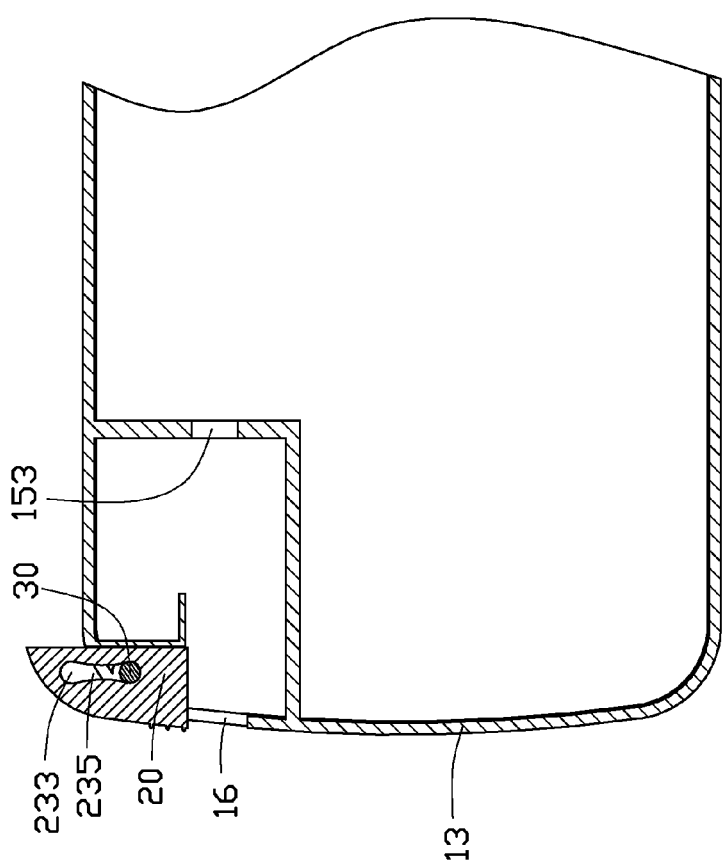
FIG. 5 shows a cross-sectional view of the protective cover mechanism, wherein, the cover is in an opened state.

Referring also to FIG. 5, to release the protective cover 20 for exposing the opening 16, the protective cover 20 is pushed to move away from the housing 10. The latching pole 30 is disengaged from the second latching end 233 and slides toward the opposite first latching end 231, and latches into the first latching end 231 of the protective cover 20 to expose the opening 20, facilitating an easy removal of stylus from the housing 10 or allowing the stylus to be put away.

It is to be understood that the latching pole 30 may be made of elastic material such as rubber, and formed integrally with the housing 10 within a single mold. Alternatively, the protective cover 20 can be hinged to the latching pole 30 to cover the opening 16 of the housing 10 or expose the opening 16.

It is to be understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A protective cover mechanism, comprising:
a housing having an opening defined therethrough, the housing including a base wall, a peripheral wall and a holding portion extending from a peripheral edge of the peripheral wall, the peripheral wall includes an end wall extending from an end portion of the base wall and two side walls extending from two sides of the base wall;
a protective cover including a covering wall shaped for covering the opening of the housing and including a latching slot defined therethrough; a plurality of ridges protruding from an outer surface of the covering wall, the latching slot including a first latching end and an opposite second latching end; and
a latching pole integrally formed on the housing adjacent to the opening and penetrating through the latching slot of the protective cover for slidably assembling the protective cover to the housing; the latching pole being latchable to the first latching end or the second latching end of the latching slot to expose or cover the opening of the housing;
wherein the holding portion includes a first holding board parallel to the end wall and a second holding board perpendicularly connecting with the first holding board and parallel to the side wall; the first holding board defines a through hole therethrough toward the end wall; a distal end of the supporting board is bent toward the first holding board side to form a clapboard; the through hole aligns with the opening.

2. The protective cover mechanism as claimed in claim 1, wherein the protective cover includes a base board, the latching slot is defined through the base board and further includes a middle guiding slot between the first and second latching end, and communicates with the first and second latching end; the latching pole is slidably assembled within the latching slot.

3. The protective cover mechanism as claimed in claim 2, wherein both the first latching end and the second latching end are substantially curved hole shaped that communicate with the middle guiding sot; the diameters of the first latching end and the second latching end are substantially the same as the diameter of the latching pole but slightly larger than that of the middle guiding slot.

4. The protective cover mechanism as claimed in claim 2, wherein the opening is defined through the peripheral wall, the latching pole perpendicularly protrudes from the base wall adjacent to the opening.

5. The protective cover mechanism as claimed in claim 4, wherein the two side walls connect with the two ends of the end wall to form two corner portions adjacent to the two ends of the end wall; the opening is defined through one corner portion of the peripheral wall.

6. The protective cover mechanism as claimed in claim 5, wherein the holding portion extending from the base wall, the holding portion, the base wall and the peripheral wall together form a receiving space adjacent to and communicating with the opening, the protective cover is slidably received in the receiving space.

7. The protective cover mechanism as claimed in claim 6, wherein the supporting board extending from the sidewall adjacent to the opening and located within the receiving space to support and guide the protective cover; the protective cover further includes an enclosing wall extending from one end of the covering wall; the enclosing wall abuts on the corresponding supporting board for facilitating the protective cover slide relative to the housing.

\* \* \* \* \*